Oct. 6, 1964

I. A. BLACK ET AL 3,152,033

INSULATING ASSEMBLY

Filed June 17, 1960

INVENTORS
IGOR A. BLACK
ARTHUR A. FOWLE
BY
Attorney

United States Patent Office 3,152,033
Patented Oct. 6, 1964

3,152,033
INSULATING ASSEMBLY
Igor A. Black, Harvard, and Arthur A. Fowle, Winchester,
Mass., assignors to Arthur D. Little, Inc., Cambridge,
Mass., a corporation of Massachusetts
Filed June 17, 1960, Ser. No. 36,832
9 Claims. (Cl. 161—50)

This invention relates to insulation and more particularly to an insulating assembly suitable for very low-temperature and very high-temperature applications.

The very marked increase in the use of liquefied gases has indicated a need for more efficient insulation systems for storing and handling these extremely cold liquids with a minimum loss due to heat leaks. At the same time recently developed techniques in industry have dictated the need for more efficient high-temperature insulation systems. For example, the handling of molten materials, e.g., metals, which must be transported or stored requires extremely efficient high-temperature insulation. There are also a number of industrial processes which must be carried out at extremely high temperatures and which must be isolated for the sake of comfort, efficiency and safety.

The prior art concerned with low-temperature insulation has been directed primarily to the use of a vacuum with or without the use of powdered or fibrous insulating material such as perlite, which is a finely divided volcanic glass, glass fibers and the like. However, now with the requirement that an insulation system must be capable of thermally insulating liquids, the temperatures of which may approach absolute zero, it is necessary to provide an insulation system to meet such a performance requirement.

The prior art concerned with high-temperature insulation is essentially one which has developed as the requirements have become more stringent. High-temperature insulation began essentially with packing or wrapping with a number of poor heat conductors (ceramic fibers, asbestos and the like). It proceeded then to the ue of evacuated areas surrouding the high temperature to be insulated and then to the use of evacuated panels containing insulation materials. The art has also encompassed the use of numerous constructions and designs to lengthen heat leak paths and the like. Each of these prior art systems has been essentially satisfactory in providing insulation against the temperatures for which they were designed; but the use of continually higher temperatures demands more efficient high-temperature insulation systems. Such systems suitable for insulation of temperatures up to around 600° F. are now known, but it is now desirable to provide insulation systems which are capable of handling (i.e., furnishing protection for) temperatures of the order of 3000° F.

With the present demand now for insulation systems for use with handling and storing cryogenic liquid and for use with extremely hot bodies, there arises a need for efficient insulating structures which can be evacuated to minimize heat transfer by gas conduction and by convection, and which at the same time minimizes heat transfer by solid conduction and radiation.

It is therefore an object of this invention to provide an insulation system which minimizes heat transfer by conduction and radiation and which is suitable for inclusion in insulating structures which are to be evacuated. It is another object of this invention to provide an insulation system which minimizes heat transmission across an insulating structure whether the system to be insulated is at a very low temperature or a very high temperature. The term "structure" is used hereinafter to designate any enclosed space which may be evacuated and into which the insulation assembly of this invention may be placed.

It is a further object of this invention to provide insulation assemblies which are capable of contributing to the structural strength of the system to be insulated and which at the same time are easily constructed, maintained and installed.

Briefly the insulation assembly of this invention comprises a plurality of individual, thin radiation shields and spacer means adapted to maintain these thin shields in spaced relation to each other by means of contact points which are spaced at least one-eighth inch apart from each other in any direction, the radiation shields being of such strength and thickness as to be self-supporting between the contact points thereby eliminating any physical contact between the radiation shields themselves. The spacer means are, of course, of a material which exhibits minimum heat conductivity at the temperature at which the insulation assembly is to operate.

It is known in the art that relatively efficient insulation can be made by spacing radiation shields with materials such as woven nylon fabric and the like or with finely divided particulate matter such as perlite, Santocel (finely divided silica) and similar poor thermal conductors. In these prior art insulation systems the spaces between the radiation shields are more or less completely filled, thus providing an almost infinite number of contact points between the radiation shields and the material used to space them apart. It is also customary in these prior art insulation systems to use extremely thin radiation shields and to form the insulation system by winding a continuous strip of the radiation shield, with the spacers between, to form a spiral-type insulating assembly which is then inserted in a suitable structure and evacuated. Thus the radiation shields themselves do not contribute any appreciable strength to the structural strength of the insulation system, and moreover by this type of construction the spirally-wound radiation shield provides a continuous heat transfer path from one side of the structure to the other.

In contrast to this, the insulation assembly of this invention is not filled between the radiation shields, for the spacers used are maintained relatively far apart. The radiation shields themselves are in the form of individual thin sheets and they never touch the adjacent shield nor are they continuous with it. The space between the radiation shields is evacuated.

There are many applications for the insulation assembly of this invention and some of them will be illustrated in the detailed description below. This invention may be further described with reference to the accompanying drawings in which.

Figure 1:
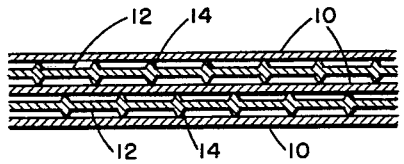
FIGS. 1 through 7 are cross-sectional representations of a portion of each of several modifications of the insulation assembly constructed in accordance with this invention.
Figure 2:
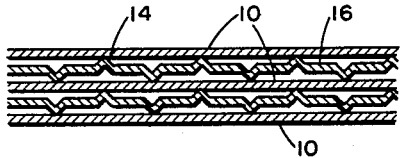

It is known that heat is transferred by one or a combination of three processes: convection, conduction and radiation. It has long been known that heat transferred by gas convection and conduction can be materially reduced or even overcome by a high degree of evacuation. This means then that in an evacuated insulating panel heat from outside in or from inside out is transferred almost exclusively by particle conduction and radiation and that any insulating material designed to operate efficiently when the temperature difference extends up to the range of 3000° F., as in high-temperature insulation, must provide extremely efficient means for reducing heat transfer by particle conduction and radiation.

The kinetic theory of gases can be used to explain how fine particles become excellent insulators under vacuum. The thermal conductivity of a gas is proportional to the mean-free path of its constituent molecules and depends on the gas composition. As the gas pressure is lowered the mean-free path increases until it exceeds the average particle spacing. Under these conditions, intermolecular collisions lose their importance until finally the gas molecules travel unhindered between the confining walls of the adjacent solid particles; therefore, the particle structure imposes an upper limit on the mean-free path within the insulation. As the pressure is further lowered, and more gas molecules are being removed, less heat is transferred and the thermal conductivity decreases substantially until a lower limit of thermal conductivity is obtained when virtually all gas molecules have been removed. Thus evacuating the insulation structure minimizes heat transfer by gas convection and by conduction through gas molecules. At this lower limit, thermal conductivity, however, still has a finite value because heat can be transferred by solid conduction through any insulation particles present and by radiation.

In the insulation assembly of this invention there is no insulation material such as powder or fibers between the radiation shields to transfer heat by conduction. Only a limited number of the spacer means can touch the radiation shields and form contact between them. Therefore in an insulation assembly constructed according to this invention substantially all of the heat is transferred by radiation. The transfer of heat by radiation may be controlled by one of three methods: namely, absorption, reflection or scattering of the radiation. The insulation assembly of this invention provides no means for absorbing the radiant energy, but rather depends almost exclusively on the reflection method by incorporating a large number of radiation shields. These shields are, moreover, spaced apart in a manner to reduce heat transfer by conduction to the minimum.

It may be shown that for a given number of radiation shields in series the net radiant flux is inversely proportional to the number of and directly proportional to the emissivity of the shield material and to the difference in the fourth power of the absolute temperature between the high and low temperature sides of the insulation structure. Thus, by reducing conduction and convection to the very minimum and by using a large number of radiation shields it is possible to make an extremely efficient insulation system.

The individual radiation shields may be formed of any material which is known to possess a very high degree of reflectivity, i.e., of the order of 0.9 or greater. Thus, such materials as thin sheets of aluminum, silver, gold or rhodium are suited to the insulation of this invention. Also materials, such as Mylar (saturated polyester film), coated to a high degree of reflectivity with any of these metals or other materials which achieve the degree of reflectivity desired are also suitable for this insulation system. The radiation shield material will be chosen according to the application to which the insulation assembly is to be put. For example, aluminum is suitable for insulating very low temperature bodies while materials such as titanium, rhodium and stellite are suitable for high-temperature insulation.

Because of the limited number of contact points used between the spacers and the radiation shields, because there is no continuous filler material between these radiation shields, and because the radiation shields themselves are discrete sheets rather than a continuous strip, it is necessary for the radiation shields to be of a thickness and strength sufficient to be self-supporting. That is, they must be capable of supporting themselves on the contact points of the spacers so as to prevent any contact between the shields themselves. It has been found convenient in the practice of this invention to use aluminum foil which is at least 0.0005 inch thick and preferably an aluminum foil which is from 0.001 to 0.005 inch thick. By the use of this aluminum foil it is possible to construct an insulation assembly which in itself is capable of contributing a relatively large amount of structural strength to the body which is to be insulated. Such a system would be particularly well adapted to the use of insulating space vehicles for the insulation could either serve as, or materially complement the strength of, the housing of the vehicle. Likewise, the structural strength contributed by the insulation assembly of this invention is particularly well adapted to making vessels or cylindrical tanks for holding liquefied gases, for it can be appreciated that such vessels must support relatively heavy loads.

In FIGS. 1–7 there are shown cross-sectional portions of typical examples of the insulation assembly of this invention. Since it has been found in actual practice that the insulation assemblies should contain at least 40 radiation shields per inch of thickness, it will be appreciated that FIGS. 1–7 represent very much enlarged cross-sectional drawings of only a small portion of the insulation assembly.

Turning now to FIG. 1 there are shown the radiation shields 10 held in spaced relationship by spacers 12 which are formed, in this embodiment, of a plastic material such as polyethylene which has been so molded as to provide a series of points 14 on each side of the spacers. The radiation shields 10 are supported on these points. In like manner, in FIG. 2 the radiation shields 10 are separated by a plastic or other suitable spacer 16 in which the embossed points 14 alternate from one side to the other side of the spacer.

Figure 3:
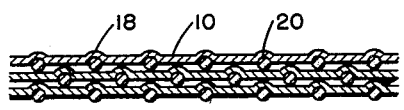
Figure 4:
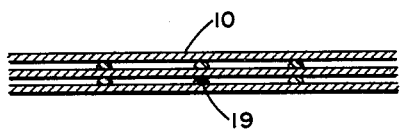
Figure 5:
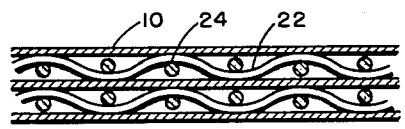

In FIG. 3 the radiation shields 10 themselves have been constructed to have systematically spaced shallow wells 18 into which suitable spherical spacers 20 may rest or be permanently affixed. When the diameter of the spherical spacers 20 is greater than the extent to which the shield is curved upwardly, it will be seen that there is no contact between the radiation shields themselves. FIG. 4 is a modification of FIG. 3 showing how small spacer balls or droplets 19 may be affixed to the surface of the radiation shields 10 without the use of indentations. FIG. 5 shows radiation shields 10 which have been spaced apart by a very coarse network of a resin or plastic fabric, wherein the numeral 22 represents the warp threads, while 24 represents the woof threads.

Figure 6:
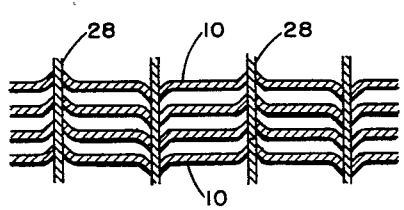
Figure 7:
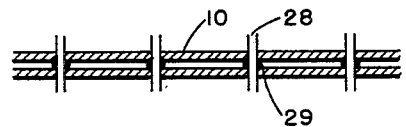

Another way of attaining the desired spacing is illustrated in FIGS. 6 and 7 in which the radiation shields 10 are held apart by virtue of the spacing strips 28 having been inserted in holes punched in the radiation shields. By forming these holes by punching alternately in one direction and then in another, it will be appreciated that when a spacer such as a plastic strip 28 is inserted the shields will be held in place by virtue of the alternating direction of the conical sides of the holes. The structure of FIG. 7 is a modification of that shown in FIG. 6, in that small spacers 29 are located around the spacing strips 28.

As in the case of the radiation shield material, the spacer material wil lbe chosen to be compatible with the temperatures to be encountered. Thus plastic materials are preferred for low temperature insulation applications, but if high temperatures are to be encountered the spacers will be formed of materials, such as high-melting glass or ceramics, which can withstand such temperatures. Therefore the description of the spacers, although presented in terms of plastic materials, is equally valid for ceramic spacers.

Figure 9:
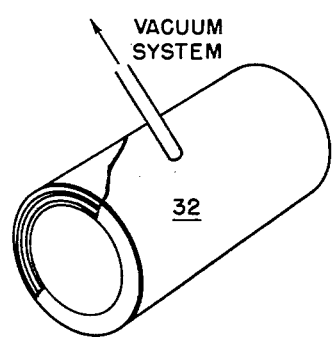
FIG. 9 illustrates the insulation assembly of this invention as it may be adapted to a circular body, such for example as a cylindrical tank which may be used on a truck designed to transport cryogenic liquids.
Figure 8:
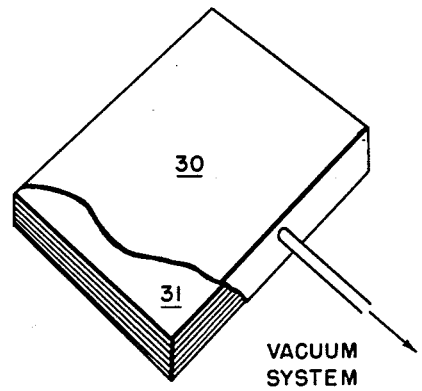
FIG. 8 illustrates the application of the insulation assembly of this invention to a flat, thin-walled panel type insulation structure.

FIGS. 8 and 9 are simplified drawings of the application of the insulation assembly of this invention to insulation structures. In FIG. 8 for example the radiation shields are sheets 31 which have been placed in proper assembly form with the use of spacers located between them and inserted into a thin-wall vacuum panel 30 such as for example a panel which might be placed in a household refrigerator door. Such panels are, of course, applicable to a large number of refrigeration problems whether the body to be insulated is maintained at an extremely high or an extremely low temperature.

There is now a great demand for transporting large quantities of cryogenic fluids, i.e., liquid hydrogen, liquid oxygen and the like, and this is most conveniently done in efficiently insulated tank trucks. FIG. 9 illustrates how the insulation assembly of this invention might be applied to such a tank truck. In such an application the individual radiation shields are arranged concentrically and the assembly located in an annular insulation structure 32. It will, of course, be appreciated that this drawing is extremely schematic and that the tank would be equally well insulated at both ends and that the proper inlet and outlet conduits would be supplied as well as means for evacuating the insulation assembly.

The insulation assembly of this invention is superior to other known insulations in which a plurality of radiation shields have been spaced apart with particulate matter or with relatively tightly woven fabrics, both of which fill substantially all of the space between them. As pointed out above, the insulation of this invention minimizes the number of contact points and substantially reduces heat transfer through conduction because of this. Evacuating the insulating system, of course, minimizes transfer of heat by convection, while the large number of radiation shields control heat transfer through radiation.

When comparable insulation panels, such as for example that illustrated in FIG. 8, are constructed according to this invention and according to the prior art teaching in which particulate matter is used for spacing, the heat transfer coefficient, normally expressed as $k$, is lower for this insulation of this invention. This may be shown in the following example, which is meant to be illustrative and not limiting.

*Example I*

An insulation assembly was formed using tempered aluminum sheets which were three inches in diameter and 2 mils thick. The spacer material used was a one-eighth inch mesh of a resin-coated glass fiber, thus making the spacer contacts about one-eighth inch apart. The assembly was formed by building up alternate sheets of aluminum and resin-coated glass mesh until there were 10 sheets of the aluminum covered on both sides with the glass mesh. The thickness of this test assembly was one-fourth inch. This assembly was then evaluated to determine its $k$ value using the test apparatus and method described in an article by Black, Fowle and Glaser in "The Proceedings of the International Institute of Refrigeration" (Paris, 1959) entitled "Single Plate Apparatus for Test of Low-Temperature Thermal Conductivity." When this panel was evacuated to $10^{-6}$ millimeters of mercury and was evaluated for its heat transfer coefficient using liquid nitrogen on one side and ambient conditions (50° F.) on the other, it was found to have a $k$ value of .0012 B.t.u./inch sq. ft. hr. ° F.

A thin wall vacuum panel was constructed in the same outside dimensions as the test assembly described above. It was filled with finely divided perlite and then subsequently evacuated. This test insulation structure had a $k$ value of 0.010. An insulation system formed of aluminum radiation shields separated by nylon mesh hose in accordance with the prior art had a $k$ value of .0040; while a similar test sample using aluminum radiation shields separated by glass wool and evacuated had a $k$ value of 0.0032.

The $k$ value data above illustrate first the value of radiation shields, and second the improvement attained by the use of the type of spacers required in the practice of this invention. When a standard test panel is filled with perlite without using any radiation shields and evacuated, the $k$ value is about 10 times that of the insulation of this invention and from 3 to 4 times that of evacuated insulation containing radiation shields spaced with fine mesh nylon or fibers, i.e., insulation having the spacing between the shields essentially completely filled. Finally, the insulation of the prior art in which the spaces between radiation shields are filled has a $k$ value of some 2.5 to 3 times greater than the insulation assembly of this invention. Where efficient insulation is required, this factor of 2.5 to 3 is not a matter of degree, but rather it provides a new insulation system which permits much more efficient handling of very hot bodies, such as might be associated with the use of space vehicles, solar furnaces, and the like or of very cold bodies, such as cryogenic fluid.

It has been found in constructing the insulation assembly of this invention that the spacers should be not less than one-eighth inch apart and preferably not greater than one-half inch apart. The actual space distance, of course, will depend upon the radiation shield used and its inherent structural strength, and therefore the one-half inch spacing is not a limitation. That is, the thicker or the stronger the radiation shield or the less weight that it must support, the further apart the spacers may be so long as there is no contact between the radiation shields.

In order to form an efficient insulating system, such as that which would be suitable for insulating a cryogenic liquid or for use in a space vehicle, it has been found that there should be at least 40 radiation shields per inch thickness. When over 80 radiation shields per inch thickness were used, no marked improvement in attaining a low $k$ value was noted. Therefore the number of radiation shields should vary between about 40 and 80 per inch thickness.

In the above description and example it has been shown how a superior insulation assembly may be formulated. The insulation of this invention has a very low heat transfer coefficient which means that it is particularly well adapted to the insulating of relatively hot or cold bodies.

We claim:

1. Insulation assembly suitable for insertion in an evacuated insulation structure, comprising a plurality of individual radiation shields and spacer means of a material having low heat conductivity adapted to maintain said shields in spaced relationship to each other by means of contact points between said spacer means and the surface of said shield whereby heat transfer by conduction through said structure is minimized, said contact points being spaced at least one-eighth inch apart from each other, said shields being present in a quantity from about 40 to 80 per inch of thickness of said structure and being of a thickness to be self-supporting on said contact points thereby to prevent any physical contact between adjacent shields.

2. Insulation assembly in accordance with claim 1 wherein said radiation shields are tempered aluminum.

3. Insulation assembly in accordance with claim 1 wherein said radiation shields are metal coated saturated polyester films.

4. Insulation assembly in accordance with claim 1 wherein said spacer means comprise coarsely woven plastic net.

5. Insulation assembly in accordance with claim 1 wherein said spacer means comprise thin strip means inserted through perforation in said shields.

6. Insulation assembly in accordance with claim 1 wherein said spacer means comprise plastic configurations attached to at least one surface of said shields.

7. Insulation comprising a gas tight evacuated structure containing therein a plurality of individual radiation shields and spacer means of a material having low heat conductivity adapted to maintain said shields in spaced relationship to each other by means of contact points between said spacer means and the surface of said shields whereby heat transfer by conduction through said structure is minimized, said contact points being spaced at least one-eighth inch part from each other, said shields being present in a quantity from about 40 to 80 per inch of thickness of said structure and being of a thickness to be self-supporting on said contact points thereby to prevent any physical contact between adjacent shields.

8. Insulation in accordance with claim 7 wherein said radiation shields are aluminum.

9. Insulation in accordance with claim 7 wherein said spacer means comprise an embossed sheet, the embossing of which provides said contact points.

References Cited in the file of this patent

UNITED STATES PATENTS

| | | |
|---|---|---|
| 1,956,323 | Gregg | Apr. 24, 1934 |
| 2,091,918 | Finck | Aug. 31, 1937 |
| 2,179,057 | Schuetz | Nov. 7, 1939 |
| 2,221,309 | Gazelle | Nov. 12, 1940 |
| 2,311,572 | Reynolds | Feb. 16, 1943 |
| 2,746,892 | Elfving | May 22, 1956 |
| 2,786,004 | Schwartz et al. | Mar. 19, 1957 |
| 2,817,124 | Dybvig | Dec. 24, 1957 |

FOREIGN PATENTS

| | | |
|---|---|---|
| 53,941 | Norway | May 22, 1934 |
| 462,215 | Great Britain | Mar. 4, 1937 |
| 683,855 | Great Britain | Dec. 3, 1952 |
| 217,667 | Australia | Oct. 13, 1958 |